US012244034B2

(12) United States Patent
Norimine et al.

(10) Patent No.: US 12,244,034 B2
(45) Date of Patent: Mar. 4, 2025

(54) BUFFER MEMBER AND ELECTRICAL STORAGE MODULE

(71) Applicant: Panasonic Intellectual Property Management Co., Ltd., Osaka (JP)

(72) Inventors: Shota Norimine, Osaka (JP); Goro Fujita, Osaka (JP); Tetsuji Omura, Hyogo (JP); Mitsutoshi Tajima, Hyogo (JP); Shingo Kume, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 505 days.

(21) Appl. No.: 17/633,370

(22) PCT Filed: Aug. 19, 2020

(86) PCT No.: PCT/JP2020/031345
§ 371 (c)(1),
(2) Date: Feb. 7, 2022

(87) PCT Pub. No.: WO2021/039549
PCT Pub. Date: Mar. 4, 2021

(65) Prior Publication Data
US 2022/0294069 A1 Sep. 15, 2022

(30) Foreign Application Priority Data
Aug. 30, 2019 (JP) ................................. 2019-158288

(51) Int. Cl.
*H01M 50/291* (2021.01)
*H01G 11/12* (2013.01)
(Continued)

(52) U.S. Cl.
CPC .......... *H01M 50/291* (2021.01); *H01G 11/12* (2013.01); *H01G 11/78* (2013.01);
(Continued)

(58) Field of Classification Search
None
See application file for complete search history.

(56) References Cited

U.S. PATENT DOCUMENTS

2012/0070718 A1   3/2012   Motohashi
2012/0129038 A1*  5/2012   Lim ................... H01M 50/291
                                                          429/156

(Continued)

FOREIGN PATENT DOCUMENTS

CN    102473876 A    5/2012
CN    106233521 A   12/2016
(Continued)

OTHER PUBLICATIONS

International Search Report of PCT application No. PCT/JP2020/031345 dated Nov. 10, 2020.
English Translation of Office Action Report dated Apr. 19, 2023 for the related Chinese Patent Application No. 202080040758.1.

*Primary Examiner* — Gregg Cantelmo
(74) *Attorney, Agent, or Firm* — Rimon P.C.

(57) ABSTRACT

An electrical storage module includes at least one electrical storage device, and a buffer member that is arrayed in first direction X together with the electrical storage device and receives a load in first direction X from the electrical storage device. The buffer member has a soft part and a hard part, which is positioned closer to an outer edge part of the buffer member than the soft part, and the soft part is more easily deformed than the hard part.

11 Claims, 10 Drawing Sheets

(51) Int. Cl.
  *H01G 11/78*    (2013.01)
  *H01M 10/04*    (2006.01)
  *H01M 50/209*   (2021.01)
  *H01M 50/236*   (2021.01)
  *H01M 50/238*   (2021.01)
  *H01M 50/242*   (2021.01)
  *H01M 50/264*   (2021.01)
  *H01M 50/293*   (2021.01)
  *H01M 50/296*   (2021.01)

(52) U.S. Cl.
  CPC ..... *H01M 10/0481* (2013.01); *H01M 50/209* (2021.01); *H01M 50/236* (2021.01); *H01M 50/238* (2021.01); *H01M 50/242* (2021.01); *H01M 50/264* (2021.01); *H01M 50/293* (2021.01); *H01M 50/296* (2021.01)

(56) References Cited

U.S. PATENT DOCUMENTS

2017/0033339 A1    2/2017  Watanabe et al.
2019/0097287 A1*   3/2019  Pflueger ............ H01M 10/6567

FOREIGN PATENT DOCUMENTS

| | | |
|---|---|---|
| CN | 207572431 U | 7/2018 |
| JP | 2011-060624 | 3/2011 |
| JP | 2014-010983 | 1/2014 |
| JP | 2015-099648 | 5/2015 |
| JP | 2015-207539 | 11/2015 |
| JP | 2020-113361 | 7/2020 |
| WO | 2011/030194 | 3/2011 |
| WO | 2015/162470 | 10/2015 |
| WO | 2018/207607 A1 | 11/2018 |

\* cited by examiner

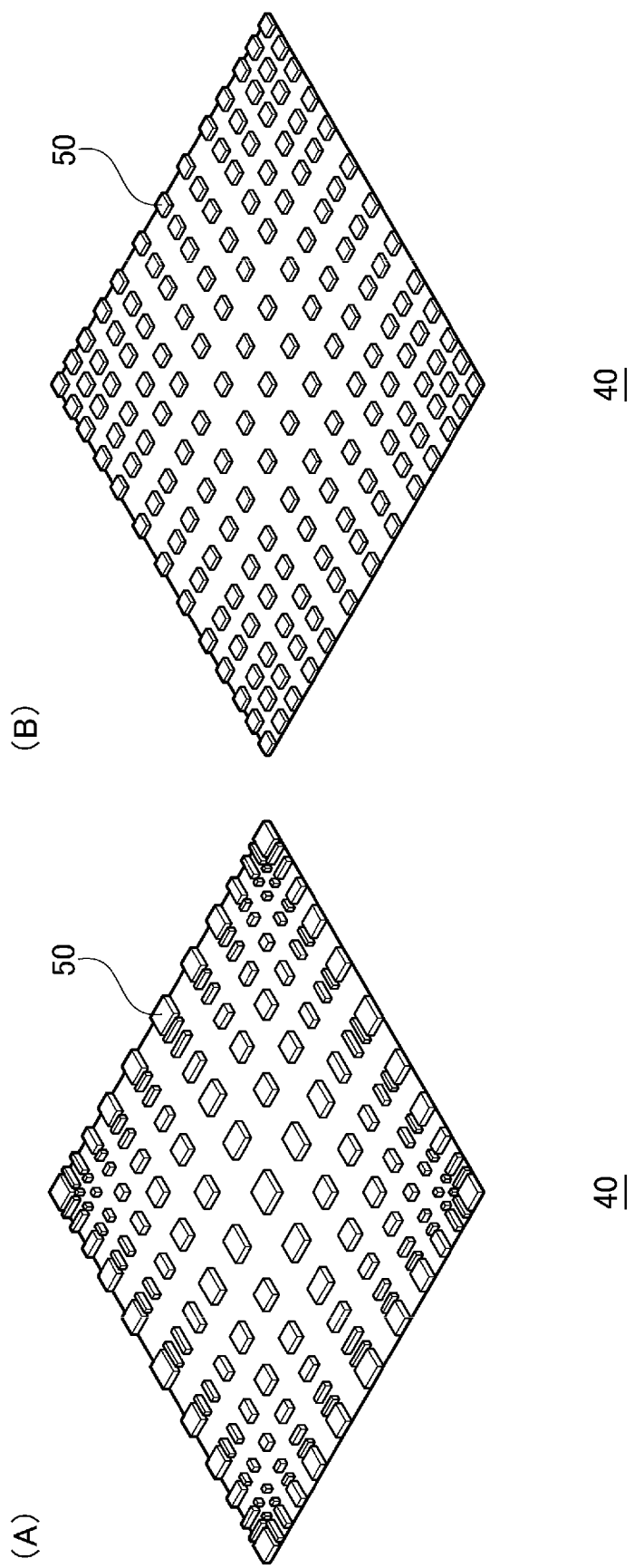

BUFFER MEMBER AND ELECTRICAL STORAGE MODULE

TECHNICAL FIELD

The present disclosure relates to a buffer member and an electrical storage module.

BACKGROUND ART

As a power source required to have a high output voltage for a vehicle, for example, there has been known an electrical storage module in which a plurality of electrical storage devices (e.g., batteries) are connected in series. In general, an electrical storage module includes: a plurality of electrical storage devices; a plurality of separators arranged between adjacent electrical storage devices; a pair of end plates arranged at both ends in an array direction of the electrical storage devices; and a bind bar that bridges over the pair of end plates to constrain the plurality of electrical storage devices in the array direction (see, for example, PTL 1).

CITATION LIST

Patent Literature

PTL 1: Unexamined Japanese Patent Publication No. 2015-99648

SUMMARY OF THE INVENTION

In general, the electrical storage device expands due to various factors. In the conventional electrical storage module, this expansion is suppressed by end plates and binding bars. In the electrical storage module, in order to maintain the electrical connection between the electrical storage devices and to prevent the electrical storage devices from popping out due to an impact from the outside or the like, the electrical storage devices are fixed by a constraining force generated by the bind bars.

In recent years, there has been a demand for further increase of a capacity of an electrical storage module. To satisfy this demand, steady efforts to increase capacity of an electrical storage device have been in progress. As the capacity of the electrical storage device is increased, an expansion amount of the electrical storage device increases, and a load applied to the bind bars also increases. Therefore, it is necessary to take measures to prevent breaking of the bind bars so as to ensure the reliability of the electrical storage module. By weakening a constraining force of the bind bar, a load applied to the bind bar can be reduced. Thus, breaking of the bind bar can be suppressed. However, when a constraining force of the bind bar is weakened, the positioning of the electrical storage device may be loosened. This gives rise to a possibility that reliability of the electrical storage module is lowered.

The present disclosure has been made in view of such circumstances, and it is an object of the present disclosure to provide a technique to increase the reliability of an electrical storage module.

An aspect of the present disclosure is an electrical storage module. This electrical storage module includes: at least one electrical storage device; and a buffer member that is arrayed in a first direction together with the electrical storage device and receives a load in the first direction from the electrical storage device. The buffer member has a soft part and a hard part, which is positioned closer to an outer edge part of the buffer member than the soft part, and the soft part is more easily deformed than the hard part.

Another aspect of the present disclosure is a buffer member that is arrayed in the first direction together with at least one electrical storage device and receives a load in the first direction from the electrical storage device. This buffer member has a soft part and a hard part, which is positioned closer to an outer edge part of the buffer member than the soft part, and the soft part is more easily deformed than the hard part.

Any combinations of the above configuration elements, and conversions of the expressions of the present disclosure among methods, devices, systems, and the like are also effective as aspects of the present disclosure.

According to the present disclosure, it is possible to increase the reliability of an electrical storage module.

BRIEF DESCRIPTION OF THE DRAWINGS

FIG. 10 is a perspective view of a buffer member 40. (A) of FIG. 10 is a perspective view of a buffer member according to a first modified example. (B) of FIG. 10 is a perspective view of a buffer member according to a second modified example.

DESCRIPTION OF EMBODIMENT

Figure 1:
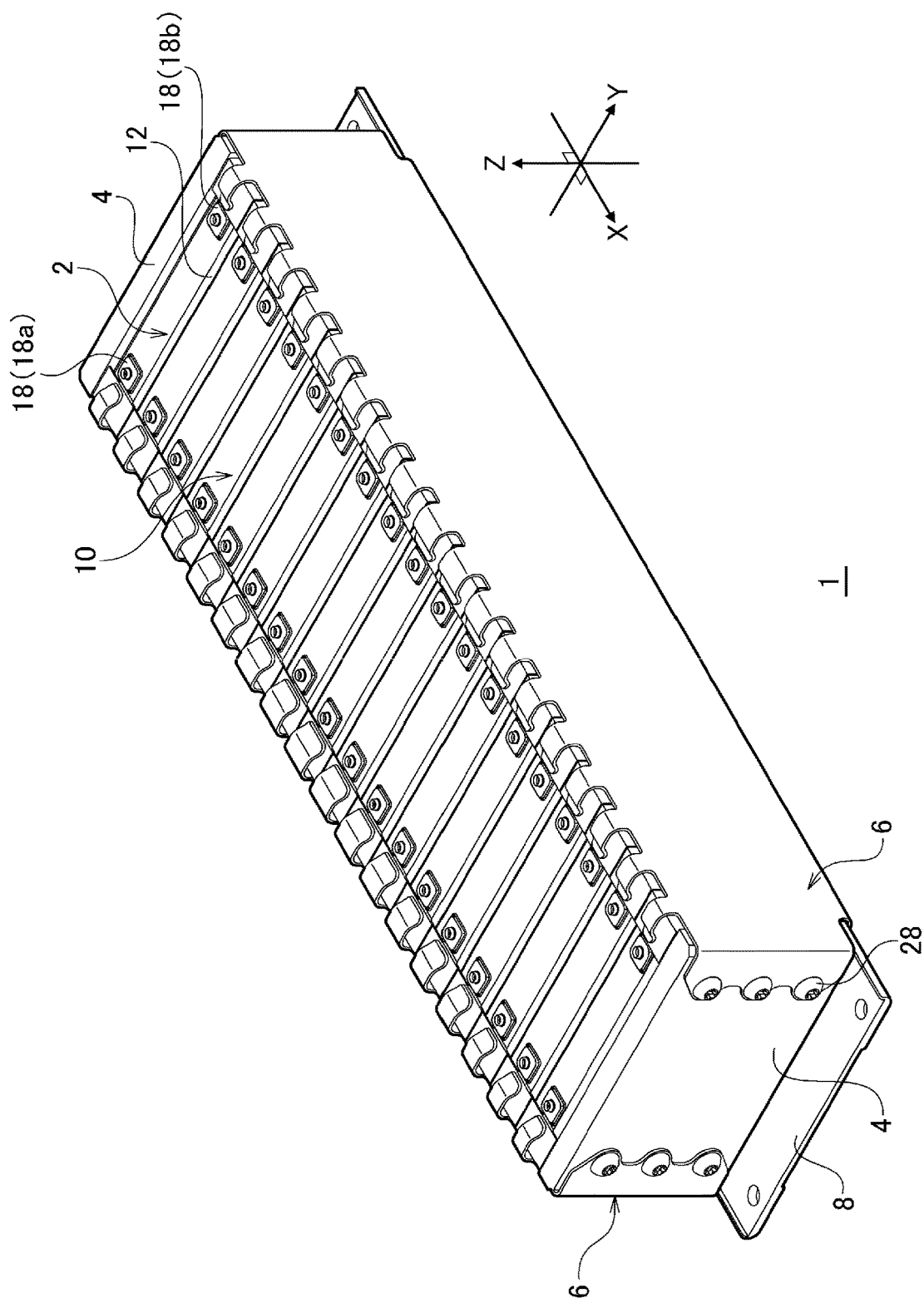
FIG. 1 is a perspective view of an electrical storage module according to an exemplary embodiment.

Hereinafter, the present disclosure will be described on the basis of preferred exemplary embodiments with reference to the drawings. The exemplary embodiments are not intended to limit the present disclosure but are illustrative, and all features described in the exemplary embodiments and combinations of the features are not necessarily essential to the present disclosure. The identical or equivalent configuration elements, members, and processing illustrated in the drawings are denoted by the same reference numerals, and repetitious description will be omitted when appropriate. The scale and the shape of each part illustrated in each drawing are set for convenience in order to facilitate the understanding of the description and should not be interpreted in a limited manner unless otherwise specified. In cases where terms such as "first" and "second" are used in the present description or claims, these terms do not represent any order or importance but are intended to distinguish one configuration from another configuration, unless otherwise specified. In each drawing, some members that are not important for describing the exemplary embodiments are omitted.

First Exemplary Embodiment

Figure 2:
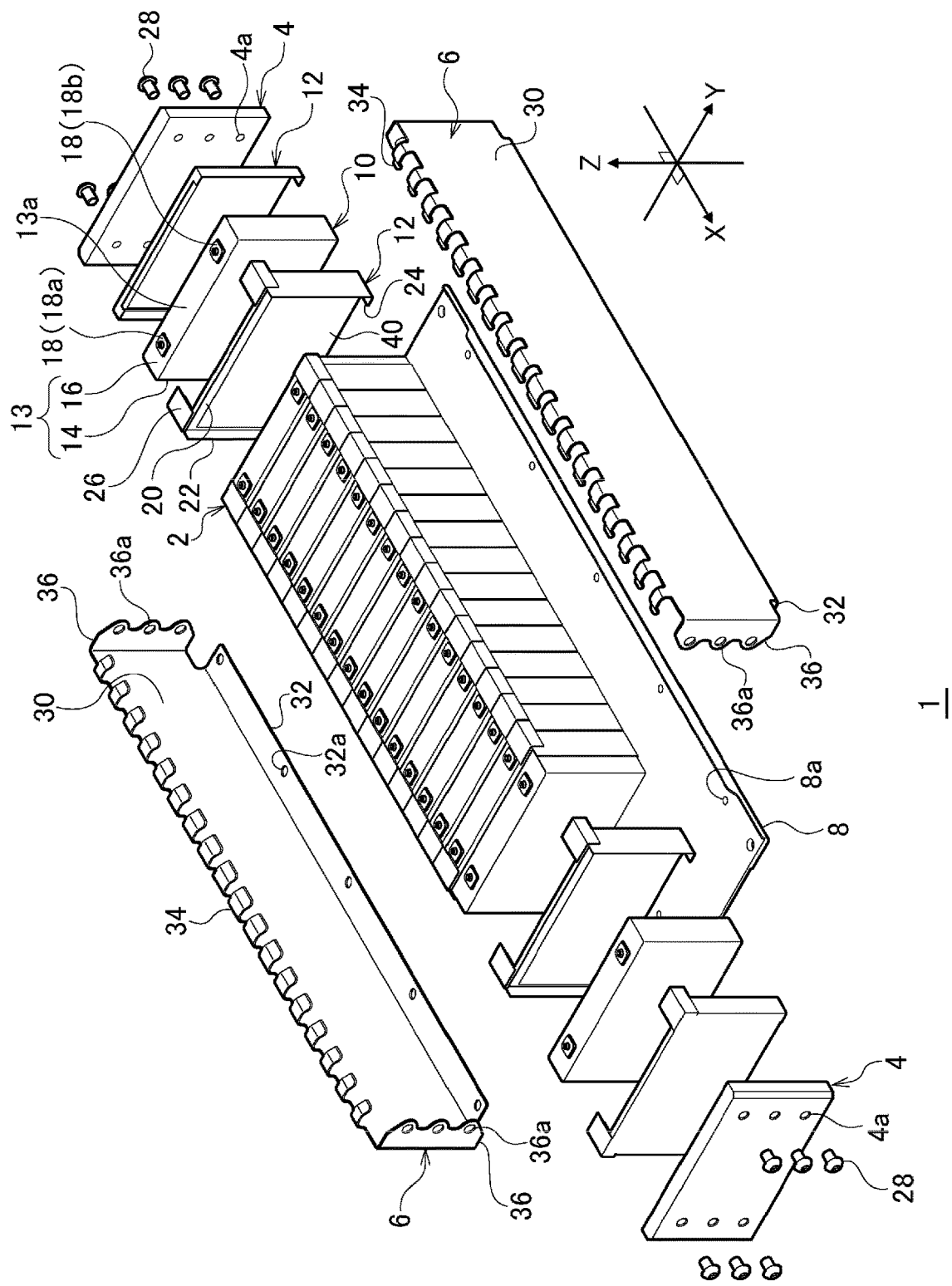
FIG. 2 is an exploded perspective view of the electrical storage module.

FIG. 1 is a perspective view of the electrical storage module according to an exemplary embodiment. FIG. 2 is an exploded perspective view of the electrical storage module. In FIG. 2, buffer member 40 is illustrated in a simplified manner. Electrical storage module 1 includes, as an example, battery stack 2, a pair of constraining members 6, and cooling plate 8. Battery stack 2 includes a plurality of electrical storage devices 10, a plurality of separators 12, a plurality of buffer members 40, and a pair of end plates 4.

Each electrical storage device 10 is, for example, a rechargeable secondary battery such as a lithium ion battery, a nickel-hydrogen battery, or a nickel-cadmium battery, or a capacitor such as an electric double layer capacitor. Electrical storage device 10 of the present exemplary embodiment is a so-called prismatic battery, and has housing 13 having a flat rectangular-parallelepiped shape. Housing 13 includes exterior can 14 and sealing plate 16. Exterior can 14 has a substantially rectangular opening on one surface. Electrode assembly 38 (see FIG. 3) that includes positive electrode 38a, negative electrode 38b, and porous separator 38d, and an electrolyte solution, and the like are accommodated in exterior can 14 via this opening. Exterior can 14 is covered with an insulating film such as a shrink tube not illustrated. By covering the surface of exterior can 14 with the insulating film, it is possible to suppress a short circuit between adjacent electrical storage devices 10, and a short circuit between electrical storage device 10 and each of end plate 4, constraining member 6, and cooling plate 8. The opening of exterior can 14 is provided with sealing plate 16 that seals exterior can 14 by closing the opening. Sealing plate 16 constitutes first surface 13a of housing 13.

Figure 3:
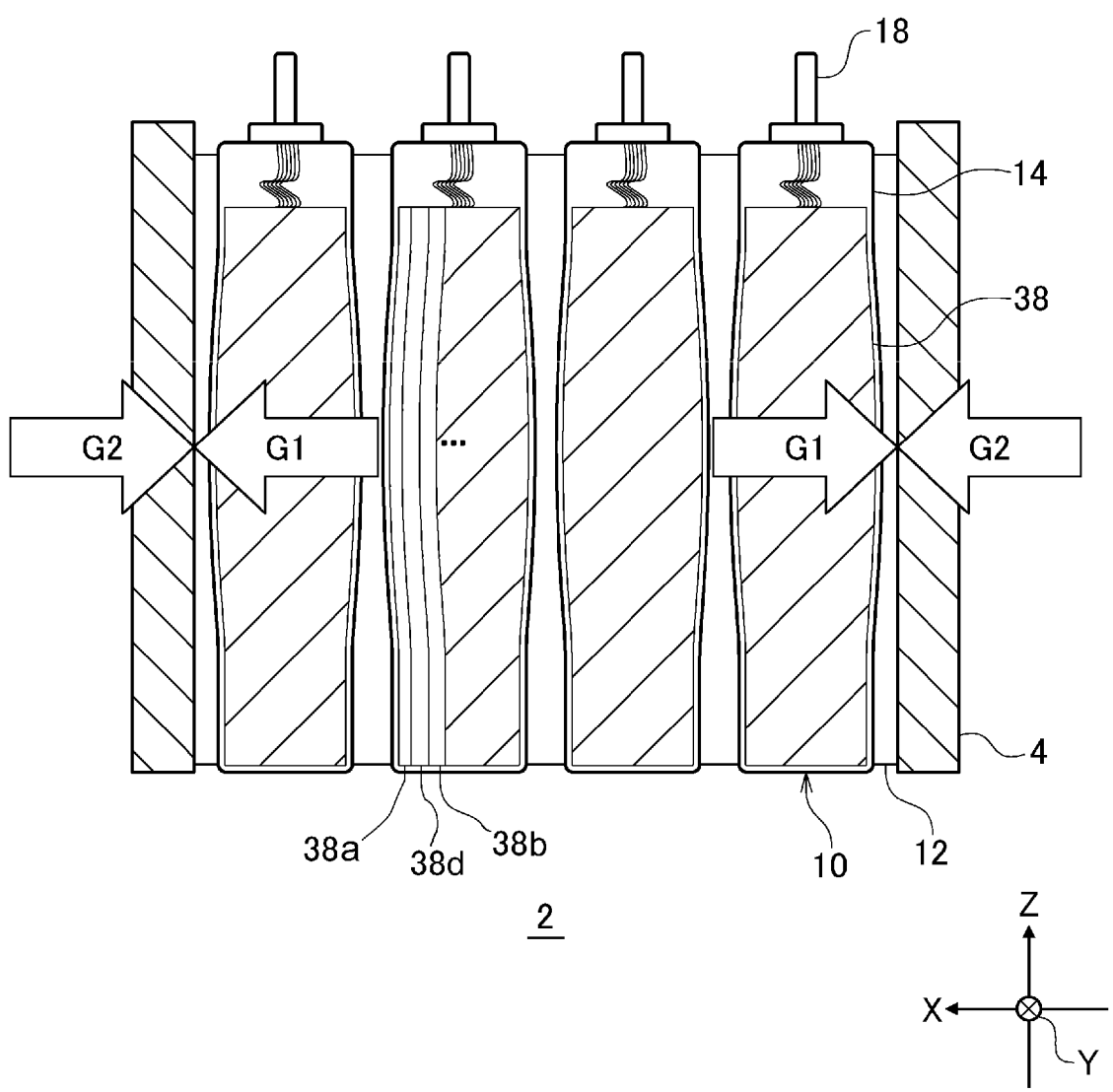
FIG. 3 is a cross-sectional view schematically illustrating expansion of each electrical storage device.

Electrode assembly 38 has a structure where a plurality of sheet-shaped positive electrodes 38a and a plurality of sheet-shaped negative electrodes 38b are alternately stacked with porous separator 38d interposed between positive electrode 38a and negative electrode 38b (see FIG. 3). Positive electrodes 38a and negative electrodes 38b are aligned in first direction X. Therefore, the electrodes positioned at both ends in the stacking direction face the long side surfaces of housing 13, which will be described later. Electrode assembly 38 may be a flat winding type electrode assembly that has a band-shaped positive electrode and a band-shaped negative electrode that are wound with a porous separator interposed between the positive electrode and the negative electrode, and have a flat part where the positive electrode and the negative electrode extend flat, and a bent part where the positive electrode and the negative electrode are bent. In this case, electrode assembly 38 is disposed so that the flat part extends in a direction intersecting (e.g., orthogonal to) first direction X. That is, electrode assembly 38 is disposed so that the thickness of the flat parts is parallel to first direction X.

Sealing plate 16, that is, first surface 13a of housing 13 is provided with output terminal 18 that is electrically connected to positive electrode 38a of electrode assembly 38 near one longitudinal end, and output terminal 18 that is electrically connected to negative electrode 38b of electrode assembly 38 near the other longitudinal end. Hereinafter, output terminal 18 connected to positive electrode 38a is referred to as positive-electrode terminal 18a, and output terminal 18 connected to negative electrode 38b is referred to as negative-electrode terminal 18b when appropriate. When it is unnecessary to distinguish the polarities of the pair of output terminals 18 from each other, positive-electrode terminal 18a and negative-electrode terminal 18b are collectively referred to as output terminals 18. Exterior can 14 and sealing plate 16 are conductors, and are made of metal such as aluminum, iron, or stainless steel, for example. Sealing plate 16 and exterior can 14 are joined to each other by, for example, a laser, friction stir welding, brazing, or the like. Alternatively, exterior can 14 and sealing plate 16 are made of a resin having insulating property.

Exterior can 14 has a bottom surface that opposes sealing plate 16. Exterior can 14 has four side surfaces connecting the opening and the bottom surface. Two of the four side surfaces are a pair of long side surfaces connected to opposing two long sides of the opening. Each long side surface is a surface having the largest area among the surfaces of exterior can 14, that is, a main surface. Each long side surface is a side surface extending in a direction intersecting (e.g., orthogonal to) first direction X. The remaining two side surfaces other than the two long side surfaces are a pair of short side surfaces connected to short sides of the opening and the bottom surface of exterior can 14. The bottom surface, the long side surface, and the short side surface of exterior can 14 correspond to the bottom surface, the long side surface, and the short side surface of housing 13, respectively.

In the description of the present exemplary embodiment, for the sake of convenience, first surface 13a of housing 13 is assumed as an upper surface of electrical storage device 10. The bottom surface of housing 13 is assumed as a bottom surface of electrical storage device 10, the long side surface of housing 13 is assumed as a long side surface of electrical storage device 10, and the short side surface of housing 13 is assumed as a short side surface of electrical storage device 10. In electrical storage module 1, a surface of electrical storage device 10 on an upper surface side is assumed as an upper surface of electrical storage module 1, a surface of electrical storage device 10 on a bottom surface side is assumed as a bottom surface of electrical storage module 1, and a surface of electrical storage device 10 on a short side surface side is assumed as a side surface of electrical storage module 1. The upper surface side of electrical storage module 1 is assumed as an upper side in a vertical direction, and the bottom surface side of electrical storage module 1 is assumed as a lower side in the vertical direction. These directions and positions are defined for the sake of convenience. Therefore, for example, a part defined as the upper surface in the present disclosure does not mean that the part is always positioned above a part defined as the bottom surface. Therefore, sealing plate 16 is not always positioned above the bottom surface of exterior can 14.

Sealing plate 16 is provided with a safety valve (not illustrated) between the pair of output terminals 18. The safety valve is configured such that when an internal pressure of housing 13 rises to a predetermined value or more, the safety valve is opened so as to release a gas in housing 13. The safety valve includes, for example, a thin part provided at a part of sealing plate 16 and thinner than another part, and a linear groove provided on a surface of this thin part. In this configuration, when the internal pressure of housing 13 rises, the thin part is torn starting from the groove so that the safety valve is opened.

The plurality of electrical storage devices 10 are juxtaposed at predetermined intervals such that the long side surfaces of adjacent electrical storage devices 10 oppose each other. In the present exemplary embodiment, the direction in which the plurality of electrical storage devices 10 are arranged side by side is defined as first direction X. Output terminals 18 of electrical storage devices 10 are disposed so as to face the same direction. In the present exemplary embodiment, output terminals 18 of electrical storage devices 10 are disposed so as to face upward in the vertical direction for convenience. Alternatively, output terminals 18 of electrical storage devices 10 may be arranged so as to face in different directions.

Adjacent two electrical storage devices 10 are arrayed (stacked) in such a manner that positive-electrode terminal 18a of one electrical storage device 10 and negative-electrode terminal 18b of the other electrical storage device 10 are adjacent to each other. Positive-electrode terminal 18a and negative-electrode terminal 18b are connected in series via a bus bar (not illustrated). Alternatively, output terminals 18 of the same polarity in the plurality of adjacent electrical storage devices 10 may be connected in parallel by a bus bar to form an electrical storage device block, and the electrical storage device blocks may be connected together in series.

Separator 12 is also referred to as an insulating spacer, and is disposed between adjacent two electrical storage devices 10 and provides electrical insulation between adjacent two electrical storage devices 10. Separator 12 is made of a resin having insulating property, for example. Examples of the resin used for separator 12 include a thermoplastic resin such as polypropylene (PP), polybutylene terephthalate (PBT), polycarbonate (PC), and a Noryl (registered trademark) resin (modified-PPE). The plurality of electrical storage devices 10 and the plurality of separators 12 are stacked alternately. Separator 12 is also arranged between electrical storage device 10 and end plate 4.

Separator 12 has plane part 20 and wall part 22. Plane part 20 is interposed between the opposing long side surfaces of adjacent two electrical storage devices 10. This provides more reliable insulation between exterior cans 14 of adjacent electrical storage devices 10 from each other.

Wall part 22 extends in first direction X where electrical storage devices 10 are arranged from the outer edge part of plane part 20, and covers a part of the upper surface, the side surface, and a part of the bottom surface of electrical storage devices 10. This can ensure a creepage distance between adjacent electrical storage devices 10 or between electrical storage device 10 and end plate 4. Insulation between exterior can 14 of electrical storage device 10 and constraining members 6 can be more reliably provided. Furthermore, the position of electrical storage device 10 in second direction Y where output terminals 18 are arranged and in third direction Z where the upper surface and the bottom surface of electrical storage device 10 are arranged can be restricted or fixed. First direction X, second direction Y, and third direction Z are directions orthogonal to one another.

Wall part 22 has cutout 24 so as to expose the bottom surface of electrical storage device 10. By providing cutout 24, it is possible to avoid thermal connection between electrical storage device 10 and cooling plate 8 from being interrupted by separator 12. Separator 12 has bias receiving parts 26 facing upward at both end parts in second direction Y.

Buffer member 40 is arrayed in first direction X together with the plurality of electrical storage devices 10. Buffer member 40 has a sheet shape, and is interposed between the long side surface of each electrical storage device 10 and plane part 20 of each separator 12, for example. The number of buffer members 40 arranged between adjacent two electrical storage devices 10 may be one or more. Buffer member 40 can be fixed to the surface of plane part 20 by adhesion or the like. Alternatively, plane part 20 may be provided with a concave part, and buffer member 40 may be fitted into this concave part. Alternatively, buffer member 40 and separator 12 may be integrally molded. Alternatively, buffer member 40 may also serve as plane part 20. The structure and action of buffer member 40 will be described in detail later.

The plurality of juxtaposed electrical storage devices 10, the plurality of separators 12, and the plurality of buffer members 40 are sandwiched by the pair of end plates 4 in first direction X. Separator 12 is disposed between the pair of end plates 4 and electrical storage devices 10 arranged at both ends in first direction X. This provides more reliable insulation between exterior cans 14 of electrical storage device 10 and end plate 4. End plate 4 is made of a metal sheet or a resin sheet, for example. End plate 4 is provided with screw hole 4a penetrating end plate 4 in first direction X, screw hole 4a with which screw 28 is threadedly engaged.

The pair of constraining members 6 are also referred to as bind bars, and are long members of which longitudinal direction is first direction X. The pair of constraining members 6 are arrayed so as to face each other in second direction Y. Battery stack 2 is interposed between the pair of constraining members 6. Each constraining member 6 includes body part 30, supporting part 32, a plurality of biasing parts 34, and a pair of fixing parts 36.

Body part 30 is a rectangular part extending in first direction X. Body part 30 extends in parallel to the side surface of each electrical storage device 10. Supporting part 32 extends in first direction X and protrudes in second direction Y from the lower end of body part 30. Supporting part 32 is a plate-shaped body continuous in first direction X, and supports battery stack 2.

The plurality of biasing parts 34 are connected to the upper end of body part 30 and protrudes in second direction Y. Supporting part 32 and each biasing part 34 oppose each other in third direction Z. The plurality of biasing parts 34 are arrayed in first direction X at predetermined intervals. Biasing parts 34 are arranged corresponding to electrical storage devices 10. Each biasing part 34 has a leaf spring shape and biases each electrical storage device 10 toward supporting part 32.

The pair of fixing parts 36 are plate-shaped bodies protruding in second direction Y from both end parts of body part 30 in first direction X. The pair of fixing parts 36 oppose each other in first direction X. Each fixing part 36 is provided with through-hole 36a through which screw 28 is inserted. Constraining member 6 is fixed to battery stack 2 by the pair of fixing parts 36.

Cooling plate 8 is a mechanism for cooling the plurality of electrical storage devices 10. Cooling plate 8 is made of a material having heat transfer property such as a metal. Battery stack 2 is placed on a main surface of cooling plate 8 in a state of being constrained by the pair of constraining members 6. A fastening member (not illustrated) such as a screw is inserted into through-holes 32a of supporting part 32 and through-hole 8a of cooling plate 8, whereby battery stack 2 is fixed to cooling plate 8. Each electrical storage device 10 is cooled by heat exchange between electrical storage device 10 and cooling plate 8. Cooling plate 8 may be provided with a refrigerant pipe (not illustrated) in which refrigerant flows.

Electrical storage module 1 is assembled, for example, as follows. That is, the plurality of electrical storage devices 10, the plurality of buffer members 40, and the plurality of separators 12 are repeatedly arrayed in this order, and sandwiched in first direction X between the pair of end plates 4, thereby forming battery stack 2. Battery stack 2 is sandwiched in second direction Y between the pair of constraining members 6. Each constraining member 6 is aligned such that through-hole 36a overlaps with screw hole 4a of end plate 4. In this state, screw 28 is inserted into through-hole 36a and threadedly engaged with screw hole 4a. In this manner, the plurality of electrical storage devices 10 are constrained by the pair of constraining members 6 being engaged with the pair of end plates 4. Battery stack 2 is fastened by constraining member 6 in a state where a predetermined pressure is applied in first direction X.

Each electrical storage device 10 is positioned in first direction X by constraining members 6 fastening electrical storage device 10 in first direction X. The bottom surface of each electrical storage device 10 is supported by supporting part 32. Wall part 22 of separator 12 is interposed between the bottom surface of each electrical storage device 10 and supporting part 32. Biasing part 34 comes into contact with bias receiving part 26 that corresponds to each electrical storage device 10. Each biasing part 34 biases each electrical storage device 10 toward supporting part 32 via bias receiving part 26. That is, each electrical storage devices 10 is sandwiched in third direction Z by supporting part 32 and the plurality of biasing parts 34. As a result, each electrical storage device 10 is positioned in third direction Z.

As an example, after the positioning of these is completed, the bus bar is attached to output terminal 18 of each electrical storage device 10, and thus output terminals 18 of the plurality of electrical storage devices 10 are electrically connected to each other. For example, the bus bars are fixed to output terminals 18 by welding. Then, the upper surface of battery stack 2 is covered with a cover member (not illustrated). The cover member prevents condensed water, dust, and the like from being brought into contact with output terminals 18, the bus bars, the safety valve, and the like of electrical storage devices 10. The cover member is made of a resin having insulating property, for example, and can be fixed to the upper surface of battery stack 2 by a well-known fixing structure (not illustrated) including screws and a well-known locking mechanism.

Battery stack 2 to which constraining members 6 and the cover member are attached is placed on cooling plate 8, and fixed to cooling plate 8 by fastening members being inserted through through-hole 8a and through-hole 32a. Electrical storage module 1 is obtained in accordance with the above-mentioned process. Electrical storage module 1 may be manufactured by mounting battery stack 2 on cooling plate 8 and, thereafter, by fixing battery stack 2 and cooling plate 8 in a collective manner using constraining member 6. In this case, cooling plate 8 is disposed inside the pair of constraining member 6.

FIG. 3 is a cross-sectional view schematically illustrating expansion of each electrical storage device 10. FIG. 3 illustrates a decimated number of electrical storage devices 10. Illustration of the internal structure of electrical storage device 10 and separator 12 is simplified, and illustration of buffer member 40 is omitted. As illustrated in FIG. 3, electrode assembly 38 is accommodated in each electrical storage device 10. In electrical storage device 10, exterior can 14 repeats expansion and contraction along with charging and discharging and the like. Expansion of exterior can 14 is mainly caused due to expansion of electrode assembly 38. When exterior can 14 of each electrical storage device 10 expands, load G1 toward the outside in first direction X is generated in battery stack 2. On the other hand, load G2 that corresponds to load G1 is applied to battery stack 2 by constraining member 6. This suppresses the expansion of electrical storage device 10.

In a structure where the plurality of electrical storage devices 10 are constrained by constraining member 6, a load is applied to constraining member 6 when electrical storage devices 10 expand. When an expansion amount increases due to an increase in capacity of electrical storage device 10, the load applied to constraining member 6 also increases. When the load applied to constraining member 6 becomes excessive, there is a possibility that constraining member 6 is broken. When the strength of constraining member 6 is enhanced in an attempt to prevent breaking of constraining member 6, such attempt may result in an increase in size and cost of constraining member 6 and, eventually, electrical storage module 1. When constraining member 6 suppresses expansion of electrical storage device 10, electrode assembly 38 (particularly, porous separator 38d) is excessively pressed, and there is a possibility that the performance of electrical storage device 10 is lowered or the life of electrical storage device 10 is shortened.

Loosening the constraining of electrical storage device 10 by constraining member 6 can reduce the load applied to constraining member 6. However, for the purpose of positioning in electrical storage module 1, it is necessary to apply a certain extent of load to each electrical storage device 10. Therefore, the constraint of electrical storage device 10 cannot be simply loosened.

Figure 4:
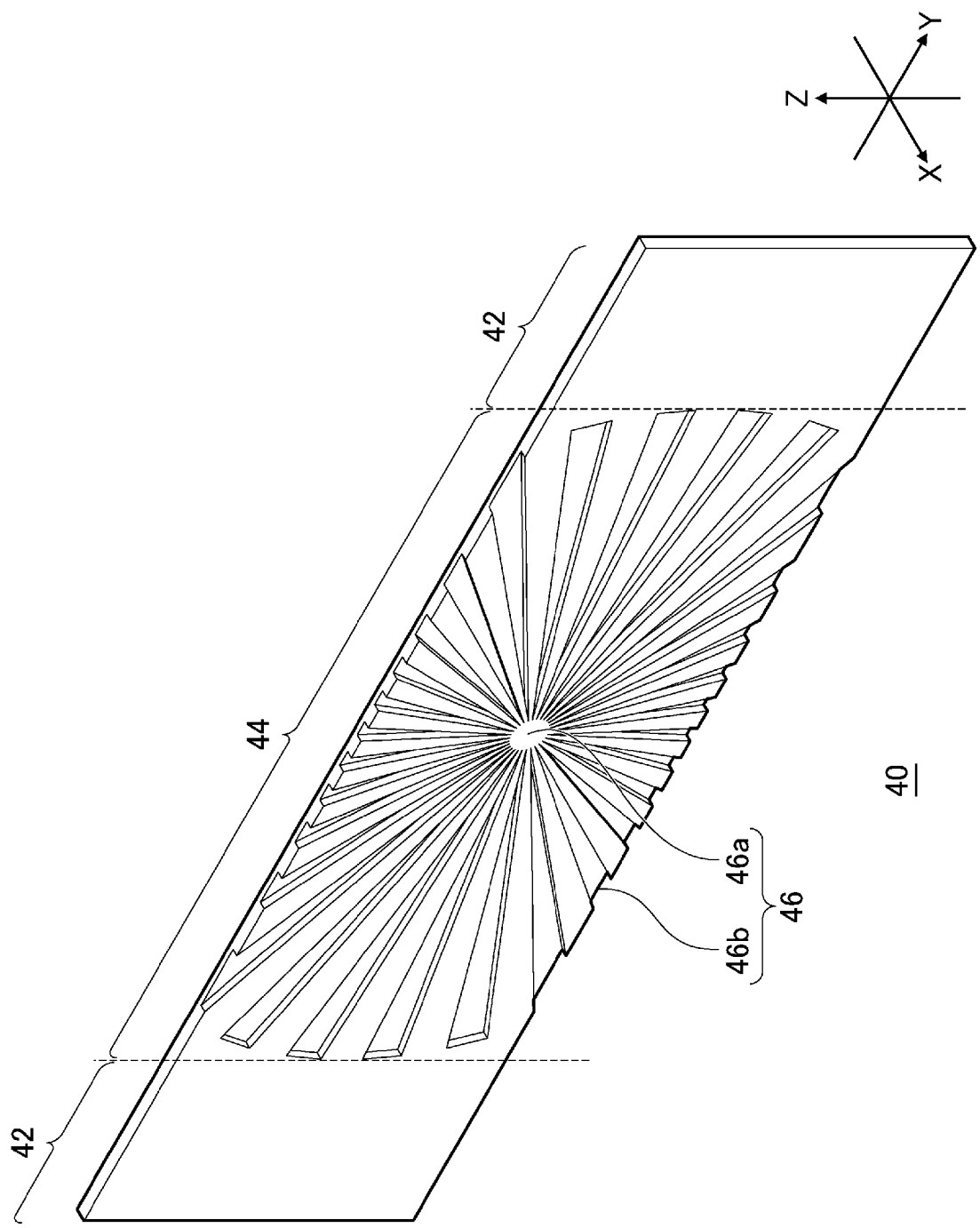
FIG. 4 is a perspective view of a buffer member according to a first exemplary embodiment.
Figure 5:
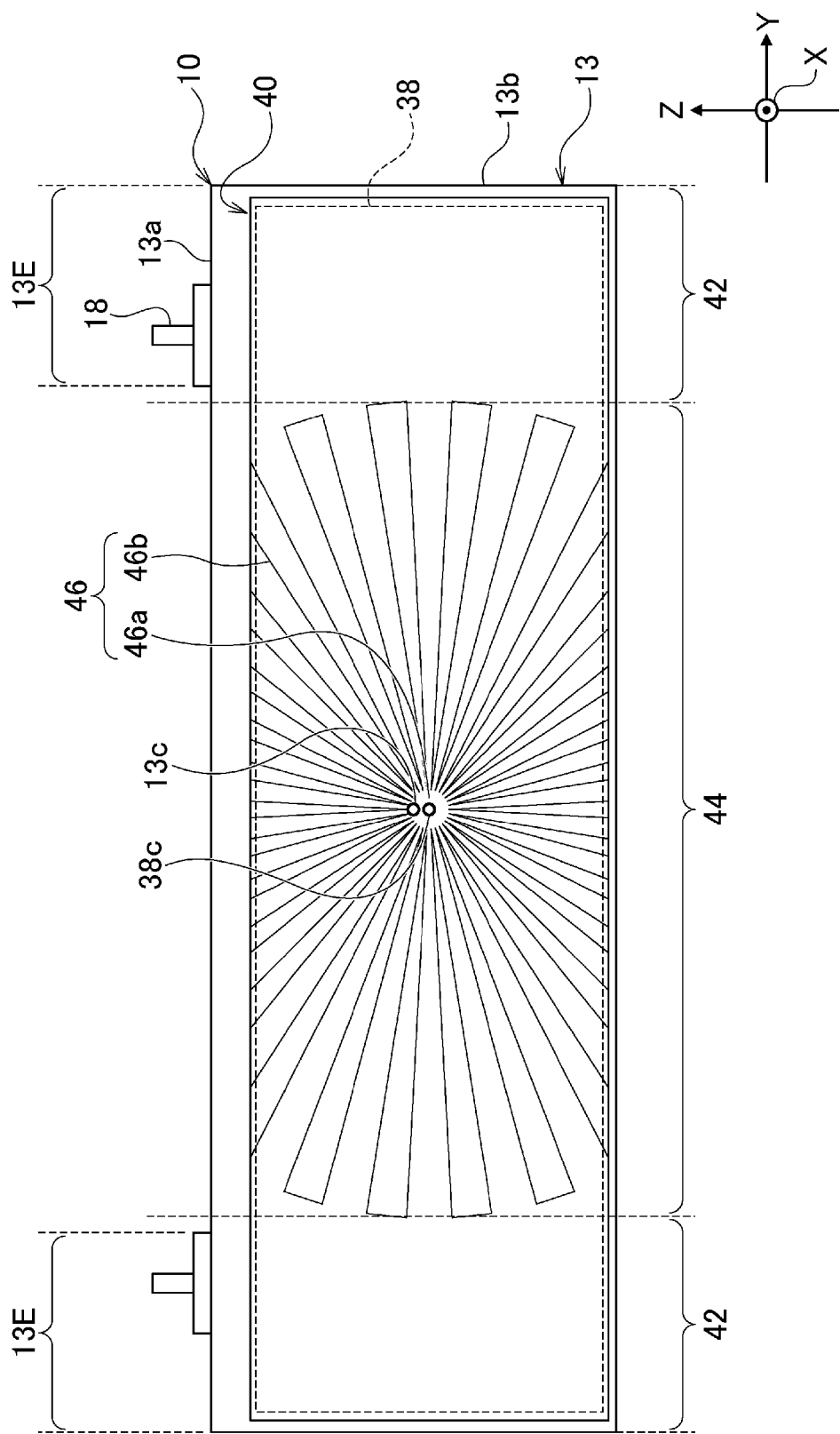
FIG. 5 is a front view of the buffer member arrayed in a first direction together with the electrical storage device.

On the other hand, electrical storage module 1 according to the present exemplary embodiment includes buffer member 40. FIG. 4 is a perspective view of buffer member 40 according to the first exemplary embodiment. FIG. 5 is a front view of buffer member 40 arrayed in first direction X together with electrical storage device 10. Note that illustration of separator 12 is omitted in FIG. 5.

Buffer member 40 is a member arrayed together with electrical storage device 10 and receives the load in first direction X from electrical storage device 10. Buffer member 40 includes hard part 42 having a predetermined deformability and soft part 44, which is more easily deformed than hard part 42.

Hard part 42 is positioned closer to the outer edge part side of buffer member 40 than soft part 44. The outer edge part of buffer member 40 is a region including, for example, an end part of buffer member 40 in second direction Y. Buffer member 40 of the present exemplary embodiment has a structure in which hard parts 42 are disposed on both ends in second direction Y, and soft part 44 is disposed between two hard parts 42.

Soft part 44 is disposed so as to overlap center 13C of the long side surface of housing 13 as viewed in first direction X. Center 13C of the long side surface of housing 13 is a geometric center of the outer shape of housing 13 viewed in first direction X, for example. Soft part 44 is disposed so as to overlap center 38C of electrode assembly 38 as viewed in first direction X. Center 38C of electrode assembly 38 is a geometric center of the outer shape of electrode assembly 38 viewed in first direction X, for example.

Hard part 42 is disposed so as to overlap at least a part of outer edge part 13E of the long side surface of housing 13 as viewed in first direction X. Outer edge part 13E of the long side surface of housing 13 is a region from end part 13b of housing 13 in second direction Y, for example, i.e., a tangent line between the short side surface and the long side surface of housing 13 to an end part inside output terminal 18 in second direction Y. Note that outer edge part 13E may be a region from end part 13b to the end part outside output terminal 18 in second direction Y.

As described above, expansion of electrical storage device 10 is mainly caused by expansion of electrode assembly 38. Electrode assembly 38 expands more in a part closer to center 38C. Therefore, when electrical storage device 10 expands, a part closer to center 13C of the long side surface of housing 13 or a part closer to center 38C of electrode assembly 38 is displaced more in first direction X, and a part closer to outer edge part 13E of the long side surface of housing 13 is displaced less. On the other hand, buffer member 40 has soft part 44, which is more easily deformed than hard part 42, and hard part 42, which is less easily deformed than soft part 44 and is positioned on the outer edge part of buffer member 40. Thus, buffer member 40 can be disposed with respect to electrical storage device 10 such that soft part 44 receives a large load generated by the large displacement of electrical storage device 10 and hard part 42 receives a small load generated by the small displacement of electrical storage device 10.

Buffer member 40 has concave part 46 recessed in a direction apart from electrical storage device 10. That is, concave part 46 is recessed in first direction X. When compressed by receiving the force from electrical storage device 10, a concave part non-forming part of buffer member 40 adjacent to concave part 46 and abuts against electrical storage device 10 can be partially displaced on concave part 46. That is, a part of the concave part non-forming part can escape into concave part 46. Therefore, providing concave part 46 can make it easy to deform the concave part non-forming part. In particular, the concave part non-forming part can be easily deformed in first direction X. In other words, even when the entirety of buffer member 40 is made of an identical material, the apparent elastic modulus of the concave part non-forming part can be reduced by providing concave part 46.

In order to make it easy to deform soft part 44, the ratio of the area of concave part 46 to the area of soft part 44 may be made larger than the ratio of the area of concave part 46 to the area of hard part 42 as viewed in first direction X. In other words, the area of the concave part non-forming part in soft part 44 may be made smaller than the area of the concave part non-forming part in hard part 42. In the present exemplary embodiment, concave part 46 is provided only in soft part 44. By arranging more concave parts 46 in soft part 44 than in hard part 42, it is possible to more easily deform soft part 44 than hard part 42. Note that hard part 42 may be provided with concave part 46 as long as the deformability of hard part 42 does not exceed the deformability of soft part 44.

Concave part 46 includes core part 46a and a plurality of line parts 46b. Core part 46a has a circular shape and is disposed at the center of buffer member 40 as viewed in first direction X. Core part 46a of the present exemplary embodiment overlaps center 13C of the long side surface of housing 13 and center 38C of electrode assembly 38 as viewed in first direction X. The plurality of line parts 46b radially extend from core part 46a. As line parts 46b radially expand, the closer to core part 46a, the higher the ratio of line parts 46b becomes, and the less the concave part non-forming part becomes. Therefore, the concave part non-forming part is more easily deformed in a region closer to core part 46a. Thus, by radially arranging line parts 46b, it is possible to efficiently change the deformability of buffer member 40 with a smaller number of line parts 46b. Therefore, soft part 44 and hard part 42 can be formed by easier processing. Each line part 46b has a line width that increases toward the outside of the radiation. The plurality of line parts 46b are connected to one another via core part 46a. Line parts 46b may extend in second direction Y or third direction Z. The plurality of line parts 46b may be arrayed in a state of being separated from each other.

Examples of the material constituting buffer member 40 include thermosetting elastomers such as natural rubber, synthetic rubber, urethane rubber, silicone rubber, and fluororubber, and thermoplastic elastomers such as polystyrene, olefin, polyurethane, polyester, and polyamide. These materials may be foamed ones. A heat insulating material on which a porous material such as silica xerogel is carried is also exemplified. Buffer member 40 of the present exemplary embodiment is provided on separator 12, which has an insulating property and insulates electrical storage device 10 from the outside (e.g., adjacent electrical storage device 10, end plate 4, constraining member 6, and the like), and constitutes a part of separator 12.

As described above, electrical storage module 1 according to the present exemplary embodiment includes at least one electrical storage device 10, and buffer member 40, which is arrayed in first direction X together with electrical storage device 10 and receives a load in first direction X from electrical storage device 10. Buffer member 40 has soft part 44 and hard part 42, which is positioned closer to the outer edge part of buffer member 40 than soft part 44, and soft part 44 is more easily deformed than hard part 42.

This makes it possible to design the arrangement of buffer member 40 such that a large load from electrical storage device 10 is absorbed by soft part 44 and a load applied to constraining member 6 is reduced while a part of electrical storage device 10 where expansion is small is pressed by the hard part 42 and electrical storage device 10 is positioned. That is, the deformability of buffer member 40 can be made different in accordance with the expansion shape of electrical storage device 10 in the plane of buffer member 40. Therefore, according to the present exemplary embodiment, even if the expansion amount of electrical storage device 10 increases with an increase in capacity of electrical storage device 10, the expansion of electrical storage device 10 can be more reliably absorbed while electrical storage device 10 is positioned, and the load applied to constraining member 6 can be reduced. Therefore, it is possible to achieve both suppression of damage of constraining member 6 and positioning of electrical storage device 10. As a result, it is possible to enhance the reliability of electrical storage module 1.

In general, the expansion amount of electrical storage device 10 increases along with a lapse of a use period. That is, the expansion amount of electrical storage device 10 changes between an initial stage of life and a terminal stage of life. On the other hand, according to the present exemplary embodiment, the constraining force of battery stack 2 by constraining member 6 is set in accordance with the small expansion of electrical storage device 10 at the initial stage of life, whereby electrical storage device 10 is more reliably positioned. The large expansion of electrical storage device 10 at the terminal stage of life is absorbed by soft part 44, whereby the load applied to constraining member 6 can be reduced. Therefore, even when the expansion amount of electrical storage device 10 changes between the initial stage of life and the terminal stage of life, electrical storage device 10 can be held with an appropriate constraining force in accordance with the expansion amount of electrical storage device 10 at each stage.

It is possible to avoid an increase in strength of constraining member 6 and it is hence possible to suppress an increase in size, weight, cost, and the like of constraining member 6, and eventually, electrical storage module 1. It is also possible to suppress an occurrence of a case where a load applied to electrical storage device 10 increases and performance of electrical storage device 10 is lowered and the life of electrical storage device 10 is shortened.

Soft part 44 of the present exemplary embodiment is disposed so as to overlap center 13C of the long side surface of housing 13 as viewed in first direction X and so as to overlap center 38C of electrode assembly 38. Hard part 42 is disposed so as to overlap at least a part of outer edge part 13E of the long side surface of housing 13 as viewed in first direction X. Center 13C of the long side surface of housing 13 and center 38C of electrode assembly 38 are parts where the displacement amount accompanying the expansion is large, and outer edge part 13E of the long side surface of housing 13 is a part where the displacement amount accompanying the expansion is small. Therefore, by arranging soft part 44 and hard part 42 as described above, it is possible to more reliably achieve suppression of damage of constraining member 6 and positioning of electrical storage device 10.

Buffer member 40 has concave part 46 recessed in a direction apart from electrical storage device 10. The ratio of the area of concave part 46 to the area of soft part 44 as viewed in first direction X is larger than the ratio of the area of concave part 46 to the area of hard part 42. This can achieve both suppression of damage of constraining member 6 and positioning of electrical storage device 10 with a simple configuration.

Concave part 46 includes the plurality of line parts 46b extending radially. This can cause the displacement of soft part 44 to follow, with higher accuracy, the expansion of electrical storage device 10 gradually decreasing from center 13C of the long side surface of housing 13 or center 38C of electrode assembly 38 toward outer edge part 13E of the long side surface of housing 13. Therefore, it is possible to achieve both absorption of expansion and positioning of electrical storage device 10.

Each line part 46b has a line width that increases toward the outside of the radiation. This makes it possible to more reliably deform the peripheral edge part of soft part 44. Concave part 46, more specifically, line part 46b extends to the outer edge part of buffer member 40 in third direction Z. The end part of concave part 46 is opened at the outer edge part of buffer member 40. This can make it easy to discharge air in concave part 46 to the outside of concave part 46 when the concave part non-forming part is compressed and partially displaced toward concave part 46. Therefore, the concave part non-forming part can be more easily deformed as compared with the case where the opening of concave part 46 is closed by electrical storage device 10. A part of line part 46b may be positioned outside the expanding region of electrical storage device 10 as viewed in first direction X (see FIG. 9). The "expanding region" described above may be, for example, the entire long side surface of housing 13 or a region smaller than the entire long side surface. When the entire long side surface expands, buffer member 40 may be larger than the long side surface. Also this structure can easily release the air in concave part 46, and can more easily deform the concave part non-forming part. The depth (dimension in first direction X) of concave part 46 may be changed according to the expansion shape of electrical storage device 10. For example, the closer to the center of buffer member 40, the deeper concave part 46 may be made.

Buffer member 40 of the present exemplary embodiment is provided on separator 12, which has an insulating property and insulates electrical storage device 10 from the outside, and constitutes a part of separator 12. This makes it possible to easily install buffer member 40. It is possible to suppress an increase in the number of components of electrical storage module 1 due to providing of buffer member 40.

Second Exemplary Embodiment

Figure 6:
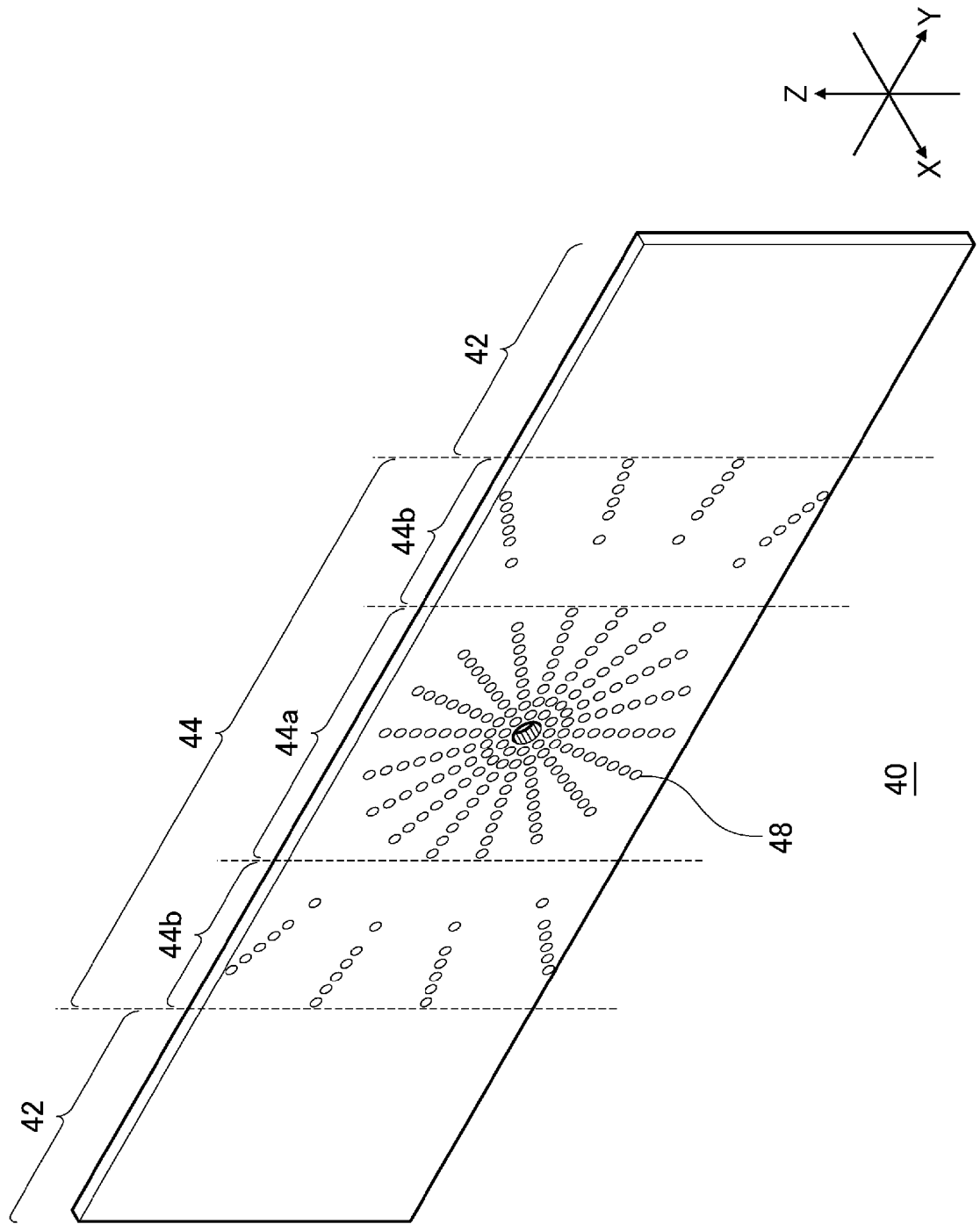
FIG. 6 is a perspective view of a buffer member according to a second exemplary embodiment.
Figure 7:
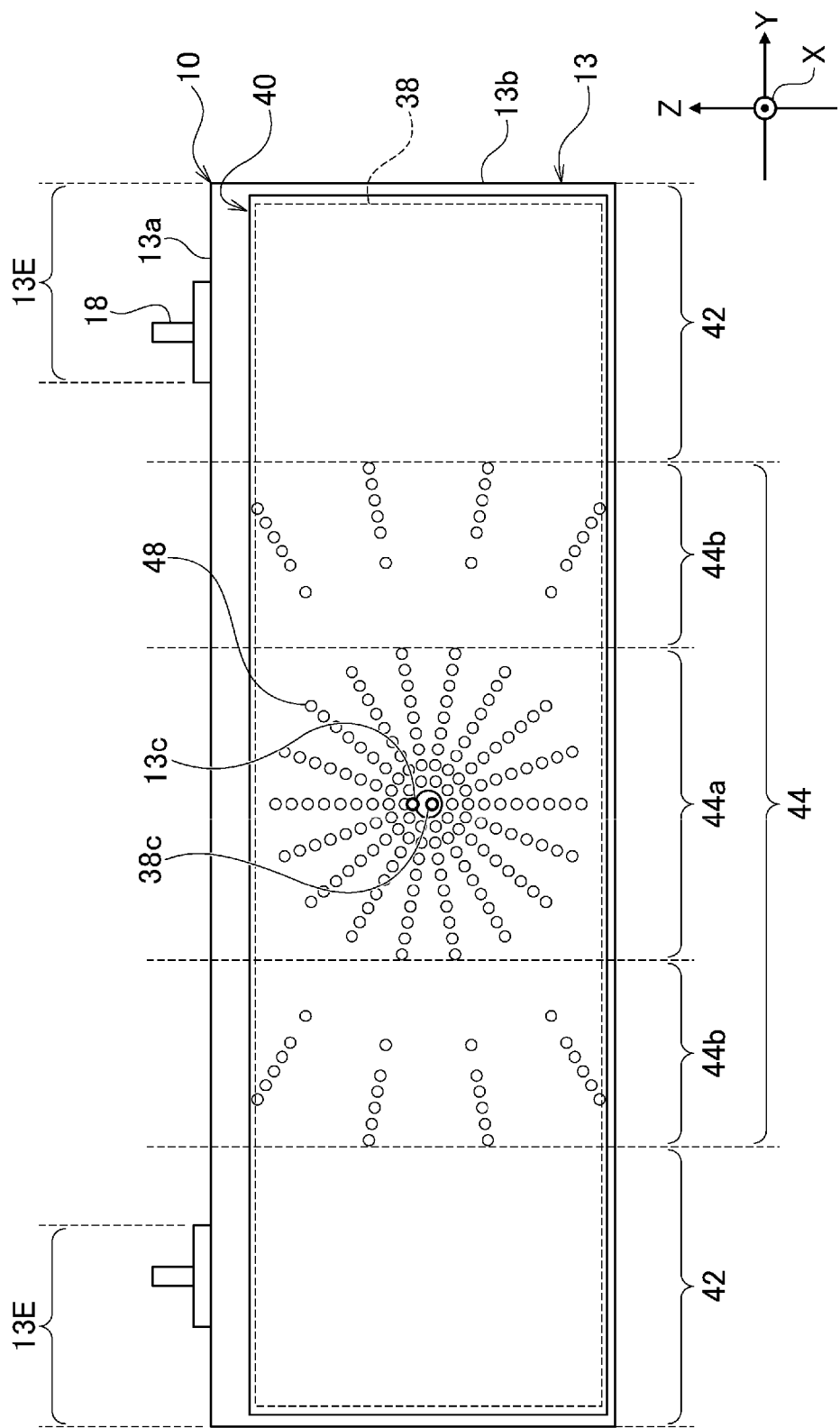
FIG. 7 is a front view of the buffer member arrayed in the first direction together with the electrical storage device.

The second exemplary embodiment has a configuration common to that of the first exemplary embodiment except for the shape of buffer member 40. Hereinafter, the present exemplary embodiment will be described mainly on a configuration different from that of the first exemplary embodiment, and common configurations will be briefly described or not described. FIG. 6 is a perspective view of buffer member 40 according to the second exemplary embodiment. FIG. 7 is a front view of buffer member 40 arrayed in first direction X together with electrical storage device 10. Note that illustration of separator 12 is omitted in FIG. 7.

Buffer member 40 includes soft part 44 having a predetermined deformability and hard part 42, which is positioned on the outer edge part of buffer member 40 relative to soft part 44 and is less easily deformed than soft part 44. Soft part 44 is disposed so as to overlap center 13C of the long side surface of housing 13 as viewed in first direction X. Soft part 44 is disposed so as to overlap center 38C of electrode assembly 38 as viewed in first direction X. Hard part 42 is disposed so as to overlap at least a part of outer edge part 13E on the long side surface of housing 13 as viewed in first direction X.

Buffer member 40 has through-hole 48 penetrating buffer member 40 in first direction X. As viewed in first direction X, the ratio of the area of through-hole 48 to the area of soft part 44 is larger than the ratio of the area of through-hole 48 to the area of hard part 42. In the present exemplary embodiment, only soft part 44 is provided with through-hole 48. By arranging more through-holes 48 in soft part 44 than in hard part 42, in other words, by arranging less through-hole non-forming parts, it is possible to more easily deform soft part 44 with respect to hard part 42. Therefore, also by providing through-hole 48 instead of concave part 46, it is possible to obtain the same effect as that of the first exemplary embodiment.

Soft part 44 includes high soft part 44a that has a relatively large area occupied by through-hole 48 and is thus easily deformed, and low soft part 44b that has a relatively small area occupied by through-hole 48 and is thus less easily deformed. High soft part 44a is disposed at the center of buffer member 40 in second direction Y, and overlaps center 13C of the long side surface of housing 13 and center 38C of electrode assembly 38. Low soft parts 44b are disposed on both outsides of high soft part 44a in second direction Y. Therefore, each low soft part 44b is interposed between high soft part 44a and hard part 42.

By disposing low soft part 44b between high soft part 44a and hard part 42, it is possible to cause the displacement of soft part 44 to follow, with higher accuracy, the expansion of electrical storage device 10 gradually decreasing from center 13C of the long side surface of housing 13 or center 38C of electrode assembly 38 toward outer edge part 13E of the long side surface of housing 13. This can achieve both suppression of damage of constraining member 6 and positioning of electrical storage device 10.

Buffer member 40 has a plurality of through-holes 48. In high soft part 44a, the plurality of through-holes 48 are arrayed so as to radially expand from the center of buffer member 40 as viewed in first direction X. This makes it possible to cause the displacement of soft part 44 to follow, with higher accuracy, the expansion of electrical storage device 10. Therefore, it is possible to achieve both suppression of damage of constraining member 6 and positioning of electrical storage device 10. As viewed in first direction X, the center of buffer member 40 is provided with through-hole 48 having a larger diameter than that of another through-hole 48. This makes it possible to more reliably absorb the load applied from the most expanding part of housing 13.

In the present exemplary embodiment, the shape of through-hole 48 viewed in first direction X is circular, but the present invention is not limited thereto. Each through-hole 48 may have a polygonal shape such as a rectangular shape, a linear shape, a curved shape, or the like as viewed in first direction X.

Third Exemplary Embodiment

Figure 8:
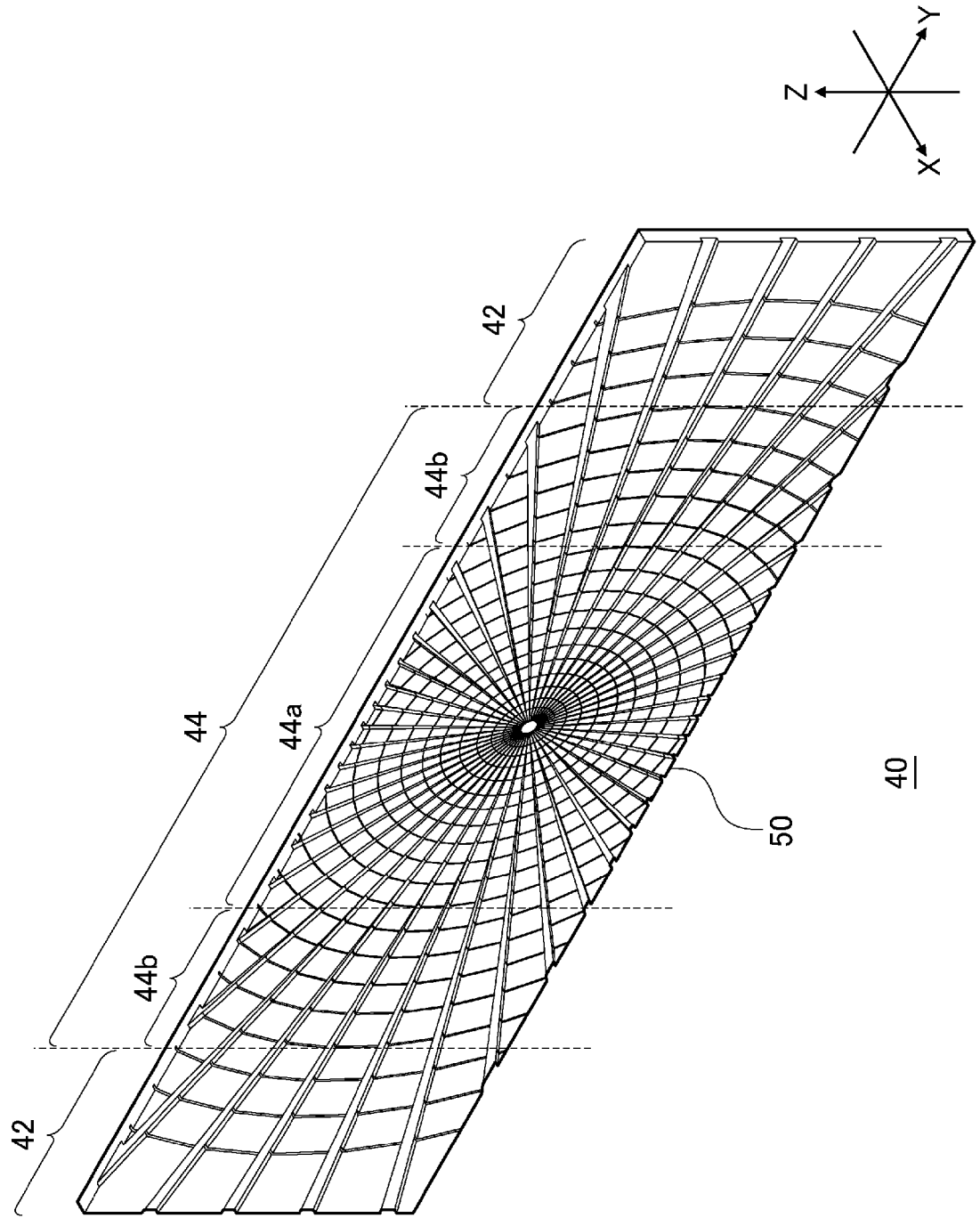
FIG. 8 is a perspective view of a buffer member according to a third exemplary embodiment.
Figure 9:
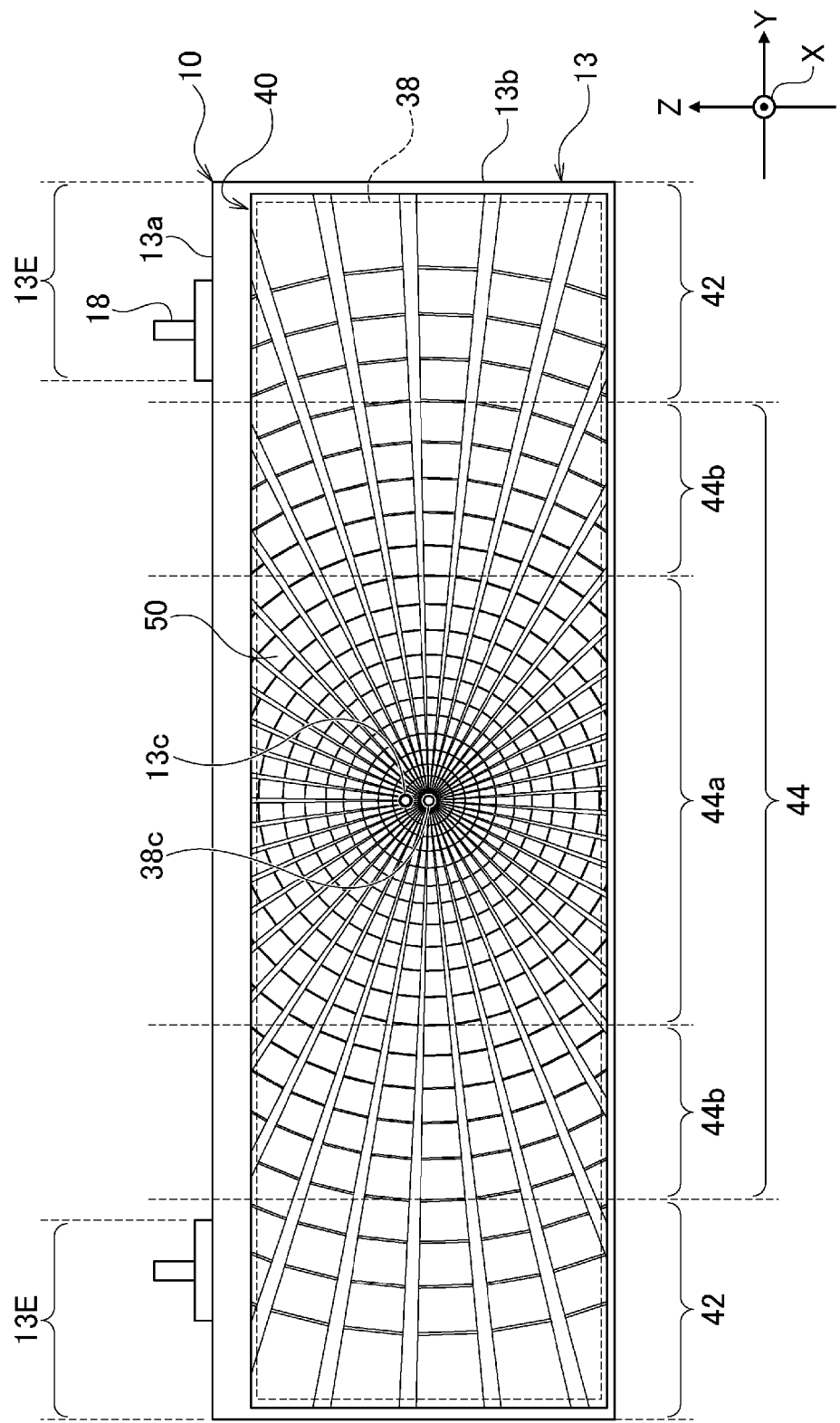
FIG. 9 is a front view of the buffer member arrayed in the first direction together with the electrical storage device.

The third exemplary embodiment has a configuration common to that of the first exemplary embodiment except for the shape of buffer member 40. Hereinafter, the present exemplary embodiment will be described mainly on a configuration different from that of the first exemplary embodiment, and common configurations will be briefly described or not described. FIG. 8 is a perspective view of buffer member 40 according to the third exemplary embodiment. FIG. 9 is a front view of buffer member 40 arrayed in first direction X together with electrical storage device 10. Note that illustration of separator 12 is omitted in FIG. 9.

Buffer member 40 includes soft part 44 having a predetermined deformability and hard part 42, which is positioned on the outer edge part of buffer member 40 relative to soft part 44 and is less easily deformed than soft part 44. Soft part 44 is disposed so as to overlap center 13C of the long side surface of housing 13 as viewed in first direction X. Soft part 44 is disposed so as to overlap center 38C of electrode assembly 38 as viewed in first direction X. Hard part 42 is disposed so as to overlap at least a part of outer edge part 13E on the long side surface of housing 13 as viewed in first direction X.

Buffer member 40 has a plurality of convex parts 50 protruding toward electrical storage device 10. That is, each convex part 50 protrudes in first direction X. The deformability of buffer member 40 is reduced in a part where convex part 50 is provided as compared with a part where convex part 50 is not provided. Buffer member 40 receives a load from electrical storage device 10 on the top surface of each convex part 50.

In order to make it easy to deform soft part 44, the ratio of the area of convex part 50 to the area of soft part 44 may be made smaller than the ratio of the area of convex part 50 to the area of hard part 42 as viewed in first direction X. In other words, the area of the convex part non-forming part in soft part 44 may be made larger than the area of the convex part non-forming part in hard part 42. The area of convex part 50 is the area of the top surface of convex part 50 that expands in the in-plane direction of a YZ plane orthogonal to first direction X in a state where no load is applied to buffer member 40, for example. By arranging less convex parts 50 in soft part 44 than in hard part 42, a part of convex part 50 becomes easily displaced to the convex part non-forming part when convex part 50 is compressed, and it is hence possible to easily deform soft part 44 with respect to hard part 42. Therefore, also by providing convex part 50 instead of concave part 46, it is possible to obtain the same effect as that of the first exemplary embodiment.

Soft part 44 includes a high soft part 44a that has a relatively small area occupied by convex part 50 and is thus easily deformed, and low soft part 44b that has a relatively large area occupied by convex part 50 and is thus less easily deformed. High soft part 44a is disposed at the center of buffer member 40 in second direction Y, and overlaps center 13C of the long side surface of housing 13 and center 38C of electrode assembly 38. Low soft parts 44b are disposed on both outsides of high soft part 44a in second direction Y. Therefore, each low soft part 44b is interposed between high soft part 44a and hard part 42.

By disposing low soft part 44b between high soft part 44a and hard part 42, it is possible to cause the displacement of soft part 44 to follow, with higher accuracy, the expansion of electrical storage device 10 gradually decreasing from center 13C of the long side surface of housing 13 or center 38C of electrode assembly 38 toward outer edge part 13E of the long side surface of housing 13. This can achieve both suppression of damage of constraining member 6 and positioning of electrical storage device 10.

Buffer member 40 has a plurality of convex parts 50. The plurality of convex parts 50 are arrayed so as to radially expand from the center of buffer member 40 as viewed in first direction X. The plurality of convex parts 50 have the area that increases toward the outside of the radiation. Therefore, buffer member 40 becomes less likely to be gradually deformed linearly or stepwise from high soft part 44a to hard part 42. This makes it possible to cause the displacement of soft part 44 to follow, with higher accuracy, the expansion of electrical storage device 10. Therefore, it is possible to achieve both suppression of damage of constraining member 6 and positioning of electrical storage device 10. The center of buffer member 40 as viewed in first direction X is provided with a concave part. This makes it possible to more reliably absorb the load applied from the most expanding part of housing 13.

In the present exemplary embodiment, the shape of convex part 50 as viewed in first direction X is rectangular, but the present invention is not limited thereto. Convex part 50 may have a polygonal shape other than a rectangular shape, a circular shape, a linear shape, a curved shape, or the like as viewed in first direction X. For example, in buffer member 40 of the first exemplary embodiment, it can also be interpreted that a part sandwiched between two adjacent line parts 46b corresponds to convex part 50 extending linearly, and the entirety of hard part 42 not provided with concave part 46 corresponds to one convex part 50. The height (dimension in first direction X) of convex part 50 may be changed according to the expansion shape of electrical storage device 10. For example, the closer to the center of buffer member 40, the lower convex part 50 may be made.

The exemplary embodiments of the present disclosure have been described in detail heretofore. The above-mentioned exemplary embodiments are merely specific examples for implementing the present disclosure. The contents of the exemplary embodiments do not limit the technical scope of the present disclosure, and many design changes such as changes, additions, and deletions, and the like of configuration elements can be made without departing from the idea of the invention defined in the claims. A new exemplary embodiment to which a design change has been made has an advantageous effect of each of the combined exemplary embodiment and modified example. In the above-mentioned exemplary embodiments, the contents where such a design change can be made are emphasized with expressions such as "of the present exemplary embodiment" and "in the present exemplary embodiment". However, design changes are allowed even for contents without such expressions. Any combination of configuration elements included in the exemplary embodiments is also effective as an aspect of the present disclosure. Hatching given to cross sections in the drawing does not limit the material of the object to which the hatching is given.

First and Second Modified Examples

Examples of arrangement of convex part 50 can include the first and second modified examples as follows. (A) of FIG. 10 is a perspective view of buffer member 40 according to the first modified example. (B) of FIG. 10 is a perspective view of buffer member 40 according to the second modified example. In the first and second modified examples, the plurality of convex parts 50 are arranged such that the interval between adjacent convex parts 50 gradually narrows from the central part toward the outer edge part of buffer member 40. Due to this, the closer to the outer edge part of buffer member 40, the more densely convex parts 50 are arranged. In the first modified example, the size of each convex part 50 changes according to the distance from the central part of buffer member 40. In the second modified example, the size of each convex part 50 is uniform.

Note that the first and second modified examples can also be regarded as a structure in which a plurality of linear concave parts 46 are arranged in a lattice shape, and in two adjacent concave parts 46 extending in parallel to each other, the width of concave part 46 positioned outside buffer member 40 is made narrower than the width of concave part 46 positioned inside.

Third Modified Example

In the exemplary embodiments, buffer member 40 in which hard parts 42 are disposed at both ends in the longitudinal direction (second direction Y) of the long side surface of housing 13 has been described. However, buffer member 40 is not limited to the above configuration. For example, hard parts 42 may be annularly arranged so as to surround the entire circumference of soft part 44.

Fourth Modified Example

Buffer member 40 may be provided to all combinations of adjacent two electrical storage devices 10, or may be provided to some combinations. Buffer member 40 may be provided between electrical storage device 10 and end plate 4 in addition to being provided between two electrical storage devices 10. Buffer member 40 may be provided only between electrical storage device 10 and end plate 4.

Fifth Modified Example

The number of electrical storage devices 10 included in electrical storage module 1 is not particularly limited, and electrical storage module 1 only needs to have at least one electrical storage device 10. The structure of each part of electrical storage module 1 including the structure of end plate 4 and constraining member 6 is not limited.

REFERENCE MARKS IN THE DRAWINGS

1 electrical storage module
10 electrical storage device
12 separator
13 housing
38 electrode assembly
40 buffer member
42 hard part
44 soft part
46 concave part
48 through-hole
50 convex part

The invention claimed is:

1. An electrical storage module comprising:
one or more electrical storage devices; and
a buffer member that is arrayed in a first direction together with the one or more electrical storage devices and receives a load in the first direction from a corresponding one of the one or more electrical storage devices, wherein:
the buffer member includes
a soft part,
a hard part positioned closer to an outer edge part of the buffer member than the soft part, and
a convex part protruding toward the corresponding one of the one or more electrical storage devices,
the soft part is more easily deformed than the hard part,
as viewed in the first direction, a ratio of an area of the convex part to an area of the soft part is smaller than a ratio of an area of the convex part to an area of the hard part,
the buffer member includes a plurality of convex parts each being the convex part, and
the plurality of convex parts are arrayed to radially expand, and include an area that increases toward an outside of a radiation.

2. The electrical storage module according to claim 1, wherein
each of the one or more electrical storage devices includes a housing, a pair of output terminals disposed on a first surface of the housing, and an electrode assembly accommodated in the housing,
the housing includes a side surface extending in a direction intersecting the first direction,
the soft part is disposed to overlap a center of the side surface as viewed in the first direction, and
the hard part is disposed to overlap at least a part of an outer edge part of the side surface as viewed in the first direction.

3. The electrical storage module according to claim 1, wherein
each of the one or more electrical storage devices includes a housing, a pair of output terminals disposed on a first surface of the housing, and an electrode assembly accommodated in the housing,
the housing includes a side surface extending in a direction intersecting the first direction,
the electrode assembly includes a positive electrode and a negative electrode arranged in the first direction,
the soft part is disposed to overlap a center of the electrode assembly as viewed in the first direction, and
the hard part is disposed to overlap at least a part of an outer edge part of the side surface as viewed in the first direction.

4. The electrical storage module according to claim 1, wherein
the buffer member includes a concave part recessed in a direction apart from the corresponding one of the one or more electrical storage devices, and
as viewed in the first direction, a ratio of an area of the concave part to an area of the soft part is larger than a ratio of an area of the concave part to an area of the hard part.

5. The electrical storage module according to claim 4, wherein
the concave part includes at least one of line parts that radially expand.

6. The electrical storage module according to claim 5, wherein
each of the one or more electrical storage devices includes a housing, a pair of output terminals disposed on a first surface of the housing, and an electrode assembly accommodated in the housing,
the housing includes a side surface extending in a direction intersecting the first direction,
the side surface includes an expansion region, and
a part of the at least one of the line parts is positioned outside the expansion region as viewed in the first direction.

7. The electrical storage module according to claim 5, wherein
the at least one of the plurality of line parts extends to an outer edge part of the buffer member.

8. The electrical storage module according to claim 1, wherein
the buffer member includes a through-hole penetrating the buffer member in the first direction, and
as viewed in the first direction, a ratio of an area of the through-hole to an area of the soft part is larger than a ratio of an area of the through-hole to an area of the hard part.

9. The electrical storage module according to claim 8, wherein
the buffer member includes a plurality of through-holes each being the through-hole, and
the plurality of through-holes are arrayed to radially expand.

10. The electrical storage module according to claim 1, wherein
the buffer member is provided on a separator that includes an insulating property and insulates the corresponding one of the one or more electrical storage devices from outside, and constitutes a part of the separator.

11. A buffer member that is arrayed in a first direction together with one or more electrical storage devices and receives a load in the first direction from a corresponding one of the one or more electrical storage devices, the buffer member comprising:
a soft part;
a hard part positioned on an outer edge part of the buffer member than the soft part; and
a convex part protruding toward the corresponding one of the one or more electrical storage devices,
wherein:
the soft part is more easily deformed than the hard part,
as viewed in the first direction, a ratio of an area of the convex part to an area of the soft part is smaller than a ratio of an area of the convex part to an area of the hard part,
the buffer member includes a plurality of convex parts each being the convex part, and
the plurality of convex parts are arrayed to radially expand, and include an area that increases toward an outside of a radiation.

* * * * *